Patented Dec. 15, 1942

2,305,379

UNITED STATES PATENT OFFICE 2,305,379

PIGMENT POWDER AND PROCESS OF PREPARING THE SAME

Stanley Rawlings Detrick, Wilmington, Del., and Joseph William Lang, Woodstown, N. J., assignors to E. I. du Pont de Nemours & Company, Wilmington, Del., a corporation of Delaware No Drawing. Application March 5, 1941, Serial No. 381,844

11 Claims. (Cl. 106—308)

This invention relates to synthetic organic pigments. More particularly it relates to processes for preparation of phthalocyanine and vat dye pigment powders of improved strength and texture.

It is an object of this invention to prepare pigment powders, such as phthalocyanine pigments or vat dye pigments, in a novel physical form characterized by high dispersibility in oil and by can-stability in a liquid paint vehicle. Other and further objects of this invention will appear as the description proceeds.

Taking for discussion the pigments of the phthalocyanine series, such as copper-phthalocyanine or metal-free phthalocyanine, these have been known to have extremely poor texture when in dry form, as compared with other organic pigments. Application of the processes of the prior art to phthalocyanine pigments does not give products which are soft textured or which have a high rate of strength development in oily vehicles.

It has been proposed in the art to improve the softness and oil-dispersibility of phthalocyanine pigment powders (the term "softness" referring to the rate of color development when a pigment powder is ground into an oil or varnish), by treating an aqueous suspension of the desired pigment with an oily substance such as toluene or white camphor oil (a terpene fraction boiling between 164 and 202° C.), emulsifying the mixture by agitation while simultaneously beating it up into a foamy mass and then drying the foam. A number of specific examples of this process are described in U. S. Patent No. 2,138,049 to Vesce. We find however that even this process is not fully satisfactory when applied to water-insoluble coloring matters of the phthalocyanine series.

Now according to our present invention the above process is modified to the extent that before admixing the aqueous suspension with the oily substance there is added thereto a special surface-active reagent of a class as defined below, which will hereinafter be referred to as a bifunctional deflocculating agent.

The bifunctional deflocculating agent aforementioned is the reaction product of a polyalkanolamine, for instance di- or triethanolamine, with a higher aliphatic acid such as oleic, stearic or lauric. The reaction is generally effected by heating the base and acid together, in substantially equimolecular proportions, at temperatures where water vapors are evolved.

The details of procedure and the selection of initial materials may run along the lines indicated in U. S. Patent No. 2,173,058 (Re. 21,530) to Krichevsky, except that somewhat lower temperatures are employed or else a shorter reaction time is allowed, whereby to prevent the esterification reaction from proceeding further than about 60 to 75% of theoretical completeness. Under the circumstances, the reaction product is found to consist of two components:

A. A water soluble portion, presumably a soap; for instance, triethanolammonium-laurate of the formula

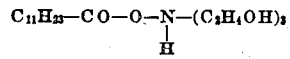

B. A water-insoluble portion, presumably an ester; most probably a mono-ester; for instance the monolauric acid ester of triethanolamine:

It will be noted that the molecule of component B is by one $H_2O$ lighter than that of component A. It will be further noted that component B still contains two free alkanol groups, by virtue of which it possesses some residual hydrophile qualities. Thus, component B itself is partly organophilic and partly hydrophilic; and since this component remains in the pigment, this factor may account for the exceptional properties of the pigment, as more fully explained below.

The two components may be prepared separately for the purpose of study and when thus individually examined it is found that component A is a good dispersing agent or deflocculating agent for solids in aqueous media, while component B if properly associated with pigment particles increases their dispersibility in oily vehicles, and may therefore be considered as a protective or dispersing agent for solids in oily media.

Inasmuch as water-soluble dispersing agents as a rule have the opposite effect of pigment-softening agents (oil-dispersing agents), tending to cake together the particles on drying instead of keeping them separated and ready for dispersion in oil media, our novel process includes a step for removing component A from the aqueous mass before drying. Altogether our improved process may be summarized by the following steps:

(1) The more or less highly flocculated phthalocyanine pigment in the form of an aqueous slurry is deflocculated by treatment with an aqueous emulsion of a bifunctional dispersing agent, that is one which has both hydrophilic and organophilic properties, such as the reaction product of lauric acid and triethanolamine above mentioned.

(2) The deflocculated phthalocyanine pigment is treated with an aqueous emulsion of a water-immiscible, inert organic liquid, such as toluene. The deflocculated pigment adsorbs the organic liquid from the emulsion to give a product in which the individual pigment particles are uniformly coated with the water-insoluble deflocculating agent and the organic liquid.

(3) This coated pigment is filtered and washed free of the water-soluble components of the bifunctional agent.

(4) The high solids press cake is dried in vacuo preferably under boiling conditions to give a very soft textured product having a high rate of strength development. The toluene evaporates while the ester component of the bifunctional agent remains as a coating on the pigment particles and acts as an oil dispersing agent.

We have found that the pigment powders thus prepared not only possess improved softness of texture, excellent rate of color development in oily vehicles (that is reaching the optimum color strength with a minimum number of grinding operations), high ultimate strength and excellent brilliancy, but they further possess the surprising quality of can-stability, that is stability against "drifting" in the can.

"Can-drifting" is a phenomenon often observed in the paint industry whereby a can of paint of a standard tinctorial strength initially, gradually loses its tinctorial strength upon standing. Copper phthalocyanine is particularly susceptible to this trouble, and paints or lacquers containing the same may become substantially weakened in tinctorial power upon standing for several days. If the paint contains two colors, for instance copper phthalocyanine and a yellow pigment which is more stable against drifting, the latter phenomenon will weaken the phthalocyanine color more than the yellow color, with the result that the shade of the coating produced by the paint takes a definite shift toward the yellow.

Now, as already stated, we have found that the products of this invention, consisting presumably of vat dye or phthalocyanine pigment particles coated with the ester of a polyalkanol amine and a higher fatty acid, exhibit a surprising degree of can stability thus opening for these colors the hitherto forbidden vast field of application in the paint and lacquer industry, as pure toners or as shading adjuvants for other colors.

This invention will be more readily understood by reference to the following examples, but is not intended that they shall limit its scope. All quantities are given in parts by weight.

EXAMPLE 1

Part A

The preferred deflocculating agent used in these experiments is prepared as follows:

Lauric acid (294 parts) and triethanolamine (206 parts) are melted together and then heated at 130 to 135° C. for three hours under good agitation or until water is no longer evolved. The product is a low melting waxy solid which consists of approximately 25 to 40% of a water-soluble fraction, presumably the triethanolamine salt of lauric acid, and the balance a water-insoluble fraction, most probably the triethanolamine ester of lauric acid. This mixture forms a uniform suspension in warm water, with the water-soluble portions acting as an emulsifying agent for the water-insoluble fraction.

Part B

To an aqueous suspension of 10 parts of the agent from Part A (containing 7.5 parts of the water-insoluble fraction) made alkaline with ammonia, is added 100 parts of copper phthalocyanine in the form of press cake as obtained by acid pasting, for instance by the procedure described in copending application of Detrick and Brandt, Serial No. 320,418. This pigment suspension is well agitated to give a homogeneous slurry. The quantity of water selected in this procedure is such as to give an ultimate slurry of about 8 to 10% solids. The deflocculation of the pigment is carried out by subjecting the slurry to a suitable mechanical milling action which may be obtained by a colloid mill, turbulent-flow tubes or by circulating the charge through a centrifugal pump. The pigment suspension is satisfactorily deflocculated if a sample disintegrates into small soft particles when dropped into a large volume of water.

To this treated pigment slurry is added an aqueous emulsion of toluene which is prepared as follows:

40 parts of toluene are added to 80 parts of water containing 2 parts of the agent from Part A, under vigorous agitation.

This emulsification is completed by circulating the toluene-water mixture through a colloid mill or turbulent-flow tube.

The pigment slurry is agitated until the toluene emulsion is well incorporated, during which procedure the pigment particles adsorb the toluene completely from the emulsion, and enables the water to separate.

The toluene-coated pigment is filtered and washed free of the water-soluble portion of the deflocculating agent. The filter cake obtained is quite high in solids (30 to 40%) and is dried in a vacuum over at 60 to 70° C. The product is a very soft textured powder having excellent strength and a rapid rate of strength development. Moreover, when converted into a lacquer or enamel by the aid of the usual vehicles, for instance alkyd resins and thinners, it exhibits a surprising degree of can stability, in the sense that no perceptible change in strength of the resulting enamel occurs after the latter has been standing even as long as 60 days.

EXAMPLE 2

The copper phthalocyanine press cake from acid pasting can be treated as in Example 1, but using a lesser amount of the deflocculating agent, for instance 2.5 parts of water-insoluble agent in place of 7.5 parts. When the lesser amount of agent is used, the amount of toluene must be reduced proportionately, for instance to 10 parts in place of the 40 parts of Example 1. The product obtained by this method has very good strength and a high rate of strength development.

EXAMPLE 3

As in Example 1, the pigment is deflocculated with the triethanolamine-lauric acid reaction product. The toluene is replaced by an equal weight of benzene in the emulsion. The product after filtering and drying in a vacuum oven is a very soft textured pigment which develops full strength with a very minimum of milling in a lithographic varnish. Alternately, xylene or chlorbenzene may be used in place of the benzene.

EXAMPLE 4

By replacing the acid pasted copper phthalocyanine press cake in Example 2 by an equal weight of acid pasted highly chlorinated copper phthalocyanine as press cake (for instance, the product of Example 1 of copending application of Fox, Serial No. 149,884, issued July 1, 1941, as Patent No. 2,247,752), a bright green powder of very soft texture and good rate of strength development is obtained.

EXAMPLE 5

60 parts of the triethanolamine-lauric acid reaction product as prepared in Example 1 and containing 75% of the ester and 25% of the water-soluble soap were emulsified in 6000 parts of water. 4550 parts of the press cake of indanthrone containing 600 parts of color and prepared by dissolving the crude color in sulfuric acid and drowning in water followed by filtration and washing, were added and stirred to a smooth slurry. A slightly alkaline condition was maintained by the addition of small quantities of ammonia. The mass was heated to 70° C. and given a light milling to break up any lumps that the stirring did not remove.

An emulsion of toluene in water was prepared by dissolving 30 parts of the ester-soap paste in 480 parts of water and adding with high speed agitation 480 parts of toluene.

This emulsion was added to the milled color slurry and the mass was stirred until the two liquids were thoroughly intermixed, after which the mixture was filtered and the filter cake was washed free of the water-soluble soap. The filter cake was dried in a vacuum oven at 65° C. The dried product was then ground to pass a 100 mesh screen.

When tested in printing inks against the same color dried similarly but not treated as above described, it was found that the treated color was much darker and brighter in masstone and the blue tints were much brighter and stronger than the untreated product.

EXAMPLE 6

600 parts of the blue dibromindanthrone, in the form of press cake obtained by acid pasting the crude color in sulfuric acid and drowning in water, were substituted for the 600 parts of indanthrone used in Example 5, and treated similarly except that 150 parts of toluene were used in place of the 480 parts used in Example 5.

A similar improvement in brightness and strength, when tested in printing ink, was obtained.

EXAMPLE 7

6000 parts of monochlor-indanthrone 10% paste were added to 6000 parts of water in which were dispersed 48 parts of the triethanolamine-lauric acid ester-soap mixture, prepared as described in Example 1, and containing 64% of the water-insoluble ester and 36% of the water-soluble soap. After stirring and milling, an emulsion of toluene in water prepared from 300 parts of water, 240 parts of toluene and 30 parts of the ester-soap mixture were added. These operations were carried out and the color was finished similar to Example 5. When tested in printing inks the improvements noted with indanthrone in Example 5 were also noted with this color.

It will be understood that our invention is susceptible of wide variation in details, without departing from the scope of this invention. Thus—

Metal-phthalocyanines other than copper, for instance those of nickel, iron or zinc, as well as metal free-phthalocyanine may be processed by this invention to give very soft textured powders of excellent rate of strength development. Likewise other vat dyestuffs than those above mentioned may be processed by this invention, including vat dyes of the indanthrone, dibenzanthrone, flavanthrone, pyranthrone, anthraquinone-acridone, and of the indigoid and thioindigoid series.

The initial form of the material to be treated according to this invention should best be that of a press cake as obtained in acid pasting (that is dissolving the color in concentrated sulfuric acid, reprecipitating by diluting in water and filtering in a filter-press). The special acid pasting process described and claimed in copending application of Detrick and Diver, Serial No. 301,171, (Pat. No. 2,284,685, issued June 2, 1942) may be employed for preparing the initial material. Especially remarkable results in the case of copper-phthalocyanine, are obtained by processing the acid-pasted material obtained by the turbulent flow tube method described and claimed in copending application of Detrick and Brandt, Serial No. 320,418.

As concerns the deflocculating agents, it appears that any agents are applicable which have a dispersing or deflocculating action on the pigment in aqueous medium and yet consist at least in part of an insoluble component which is adapted to coat the pigment particles and has a dispersing action for the pigment in non-aqueous media such as lithographic varnish, lacquers, plastics and rubbers. In particular, the polyalkanolamine-higher fatty acid reaction products described and claimed in Krichevsky's U. S. Patent Re. 21,350 are very good for our invention, provided the reaction is permitted to continue only until about 60 to 75% of the acid has been esterfied. This point may be determined by taking samples at intervals and determining the percentages of water-soluble and water-insoluble materials in the reaction mass. Preference, from the viewpoint of availability, is placed on the reaction product of triethanolamine and higher fatty acids such as oleic, stearic, or lauric. However, the reaction product of triethanolamine with cycloaliphatic acids such as abietic may also be employed.

The optimum quantity of bifunctional deflocculating agent to be employed varies with the physical form of the pigment used as initial material, and may be readily determined by experiment in each case. Highly flocculated pigment particles require more of the agent. The more agent that is used, the larger the amount of volatile solvent that can be used without causing flushing. This is advantageous since the more volatile solvent that can be used without causing flushing (that is, transfer of the pigment to the oily phase), the softer the texture of the final product obtained.

The milling may be accomplished in any convenient form of commercial mill. A good colloid type mill, such as a Manton-Gaulin mill, a Follows and Bate mill, or turbulent flow tubes will give satisfactory action. In addition, prolonged circulation of the slurry of the treated pigment through a centrifugal pump will give good deflocculation.

As water-immiscible liquid agent to be added in the form of an aqueous emulsion after incorporation of the bifunctional deflocculating agent, any inert, neutral, water-immiscible organic liquid may be used, provided it has a boiling range somewhere between about 85° C. to about 140° C. The aromatic hydrocarbons and their chlorinated derivatives within this boiling range are effective, for example toluene, benzene, xylene or monochlor benzene. Dichlorbenzene has too high a boiling point for satisfactory operations. Carbon tetrachloride also does not give good results, probably because of low boiling point.

Aliphatic hydrocarbons of narrow boiling range somewhere between 90 and 130° C. can be used, but the optimum amount of agent required must be determined for each pigment. Alcohols such as butyl alcohol are not particularly satisfactory nor is white camphor oil.

The most satisfactory results are obtained when the amount of water-immiscible agent used is as large as possible without causing flushing. From 10 to 40% based on the weight of pigment is the optimum range for copper phthalocyanine depending on the amount of agent used for defloculation.

The most satisfactory results are obtained when the pigment solvent press cake is dried under vacuo or under conditions of very high humidity and at lower temperatures. Under vacuum conditions of 25" to 30" of mercury, a temperature of 65 to 80° C. is desirable. In air driers at high humidity, temperatures of 50 to 60° C. are most effective for best quality powder. The evaporation is preferably carried to substantial dryness, that is to a final moisture content of not over 0.5% by weight.

The theory of our invention is rather complicated, and probably consists of a combination of several interlinking effects. The water-insoluble component of the bifunctional deflocculating agent acts to soften the eventual powder (that is, endow it with ready and high dispersibility in oily media), presumably by coating the individual particles and acting as a protective agent or dispersing agent during subsequent suspension of the powder in an oily medium. The water-soluble component has the double function of breaking up any agglomerates or flocs of the pigment in the initial aqueous slurry and of emulsifying the insoluble component so that it may come in intimate contact with the dispersed pigment particles. The same water-soluble component may also be employed as an emulsifying agent for preparing the toluene-water emulsion. The function of the latter is not clearly understood. In some way the toluene apparently coats the pigment particles or assists component B of the deflocculating agent in this function and prevents the caking together of these particles during the drying step, but unlike the last mentioned component it is itself removed in the final stages of the evaporation step. The water-soluble component goes down into the filtrate in the filtration and subsequent washing step. The addition of the toluene or similar agent in the form of an emulsion achieves the result that greater quantities thereof may be employed without causing flushing of the pigment into the oily phase. A dilute oil-in-water emulsion can also be used which gives the individual particles a chance to become uniformly coated with solvent.

The soft powders of this invention find application in lithographic varnishes, paints, lacquers, plastics and rubber, both natural and synthetic.

We claim:

1. A dry color composition comprising a water-insoluble organic coloring matter in finely divided solid form, the individual particles whereof are coated with the water-insoluble component of the reaction product of a polyalkanol-amine and a higher aliphatic acid.

2. A dry color composition comprising a water-insoluble organic coloring matter of the phthalocyanine series in finely divided solid form, the individual particles whereof are coated with the water-insoluble component of the reaction product of a polyalkanol-amine and a higher aliphatic acid, said color composition being characterized by improved dispersibility in oily media and by improved tintorial stability when incorporated into alkyd-resin enamels, as compared to the same coloring matter when not so coated.

3. A dry color composition comprising a water-insoluble vat dye coloring matter in finely divided solid form, the individual particles whereof are coated with the water-insoluble component of the reaction product of a polyalkanol-amine and a higher aliphatic acid, said color composition being characterized by improved dispersibility in oily media and by improved tinctorial stability when incorporated into alkyd resin enamels, as compared to the same coloring matter when not so coated.

4. A dry color composition comprising a metal-phthalocyanine in finely divided solid form, the individual particles whereof are coated with the ester of triethanolamine and a higher fatty acid selected from the group consisting of saturated and unsaturated aliphatic acids having from 12 to 18 carbon atoms, said color composition being characterized by improved dispersibility in oily media and by improved tinctorial stability when incorporated into alkyd-resin enamels, as compared to the same coloring matter when not so coated.

5. A dry color composition comprising copper-phthalocyanine in finely divided solid form, the individual particles whereof are coated with the mono ester of triethanolamine and lauric acid, said color composition being characterized by improved dispersibility in oily media and by improved tinctorial stability when incorporated into alkyd-resin enamels, as compared to copper-phthalocyanine when not so coated.

6. In the process of modifying the physical form of a pigment by treating an aqueous slurry of the same with a volatile water-immiscible liquid and then evaporating the mixture to solid state, the step which consists of incorporating into the aqueous slurry, prior to the addition of the water-immiscible liquid, a deflocculating agent being a reaction product of a polyalkanol-amine and a higher fatty acid and consisting of at least two components, one of which is water-soluble and is capable of acting as a dispersing agent in aqueous media, and the other of which is water-insoluble and has a dispersing action in oily media, whereby to break up any agglomerates of the pigment prior to treatment with said water-immiscible liquid.

7. In the process of drying an aqueous pigment paste by slurrying the same with a volatile water-immiscible liquid and subjecting the mixture to evaporation whereby to remove both water and the water-immiscible liquid, the improvement which comprises, firstly, incorporating into the pigment paste, prior to treatment with said water-immiscible liquid, a condensation product of a polyalkanol-amine with a higher fatty acid, said condensation product containing a water-soluble component capable of acting as a dispersing agent for solids in aqueous media and a water-insoluble component capable of acting as a protective agent for solids in oily media, and secondly, removing said water-soluble component by filtration after slurrying with said water-immiscible liquid but prior to said evaporation step.

8. The process of converting an aqueous pigment paste into a pigment powder capable of being dispersed in oily media, which comprises, firstly, incorporating into said aqueous pigment paste a deflocculating agent being a reaction product of a polyalkanol-amine with a higher fatty acid and containing a water-soluble component capable of acting as a dispersing agent for solids in aqueous media and a water-insoluble agent capable of acting as a protective agent for solids in oily media; secondly, incorporating into said mixture an aqueous emulsion of an inert organic water-immiscible liquid having a boiling range within the region of 85 to 140° C.; thirdly, filtering the mixture to obtain a concentrated pigment paste substantially free of the water-soluble component of said bifunctional agent; and finally evaporating the concentrated paste to remove therefrom water and said water-immiscible liquid, while leaving within the pigment the bulk of said water-insoluble component of the deflocculating agent.

9. The process of drying an aqueous pigment paste of the phthalocyanine series, which comprises firstly slurrying said paste with the reaction product of triethanolamine and a higher fatty acid containing both a soap-form reaction product and an ester-form reaction product; secondly, incorporating into said slurry an aqueous emulsion of an inert, organic, water-immiscible liquid boiling within the region of 85 to 140° C.; thirdly filtering the mixture, and finally evaporating the filter cake to substantial dryness.

10. The process of drying an aqueous pigment paste of copper phthalocyanine, which comprises firstly slurrying said paste with the reaction product of triethanolamine and lauric acid containing both triethanolammonium-laurate and the monolauric-acid ester of triethanolamine; secondly, incorporating into said slurry an aqueous emulsion of toluene; thirdly, filtering the mixture and, finally evaporating the filter cake to substantial dryness.

11. A dry color composition comprising a water-insoluble organic coloring matter in finely divided solid form, the individual particles whereof are coated with an ester of a polyalkanol amine and higher aliphatic acid, said ester possessing residual, unesterified alkanol groups.

STANLEY RAWLINGS DETRICK.
JOSEPH WILLIAM LANG.